United States Patent
Hammerschmidt et al.

(10) Patent No.: US 11,550,785 B2
(45) Date of Patent: Jan. 10, 2023

(54) BIDIRECTIONAL MAPPING OF HIERARCHICAL DATA TO DATABASE OBJECT TYPES

(71) Applicant: ORACLE INTERNATIONAL CORPORATION, Redwood Shores, CA (US)

(72) Inventors: Beda Christoph Hammerschmidt, Flensburg (DE); Zhen Hua Liu, San Mateo, CA (US); Vikas Arora, Burlingame, CA (US); Chandrasekharan Iyer, Redwood City, CA (US); Beethoven Cheng, East Palo Alto, CA (US); Ying Hu, Hollis, NH (US); Douglas James McMahon, Redwood City, CA (US)

(73) Assignee: Oracle International Corporation

( * ) Notice: Subject to any disclaimer, the term of this patent is extended or adjusted under 35 U.S.C. 154(b) by 348 days.

(21) Appl. No.: 16/389,304

(22) Filed: Apr. 19, 2019

(65) Prior Publication Data
US 2020/0334244 A1    Oct. 22, 2020

(51) Int. Cl.
*G06F 16/242* (2019.01)
*G06F 16/25* (2019.01)
*G06F 16/84* (2019.01)

(52) U.S. Cl.
CPC ........ *G06F 16/2448* (2019.01); *G06F 16/258* (2019.01); *G06F 16/86* (2019.01)

(58) Field of Classification Search
None
See application file for complete search history.

(56) References Cited

U.S. PATENT DOCUMENTS

| | | | |
|---|---|---|---|
| 7,096,224 B2 | 8/2006 | Murthy et al. | |
| 7,464,099 B2 | 12/2008 | Irons | |
| 2003/0200501 A1* | 10/2003 | Friebel | G06F 16/258 |
| | | | 715/234 |
| 2005/0289125 A1* | 12/2005 | Liu | G06F 16/2448 |
| 2007/0016610 A1* | 1/2007 | Cohen | G06F 16/86 |
| 2007/0220022 A1* | 9/2007 | Lankinen | G06F 16/258 |
| 2010/0131520 A1* | 5/2010 | Weinberg | G06F 16/86 |
| | | | 707/756 |
| 2013/0086095 A1* | 4/2013 | Barton | G06F 16/288 |
| | | | 707/758 |
| 2017/0124166 A1* | 5/2017 | Thomas | G06F 16/282 |

OTHER PUBLICATIONS

Petkovic, Dusan, "JSON Integration in Relational Database Systems", International Journal of Computer Applications (0975-8887) vol. 168, No. 5, Jun. 2017, pp. 14-19. (Year: 2017).*

Shaw S., et al., "Querying Semi-Structured Data", Practical Hive, Apress. (Year: 2016).*

(Continued)

*Primary Examiner* — Scott A. Waldron
(74) *Attorney, Agent, or Firm* — Vista IP Law Group, LLP

(57) ABSTRACT

Described is a system, method, and computer program product to perform bi-directional mapping of hierarchical data (e.g. JSON, XML) to database object types (e.g., user defined database object types).

23 Claims, 11 Drawing Sheets

(56) References Cited

OTHER PUBLICATIONS

Raghu R., Varma N.S., "JSON as ORM Mapping Database Layer for the SaaS-Based Multi-tenant Application", Recent Findings in Intelligent Computing Techniques. Advances in Intelligent Systems and Computing, vol. 709. Springer. (Year: 2018).*
Naser, Taher, et al., "Two-Way Mapping between Object-Oriented Databases and XML", Informatica 33 (2009), pp. 297-308. (Year: 2009).*
Petković, D., "JSON Integration in Relational Database Systems", *International Journal of Computer Applications* (0975-8887), vol. 168—No. 5, (Jun. 2017).
Chasseur, C. et al., "Enabling JSON Document Stores in Relational Systems", *WebDB 2013*, (Jun. 2013).
Piech, M. et al., "A new approach to storing dynamic data in relational databases using JSON", *Computer Science*, 19(1), (Feb. 19, 2018).
Liu, Z. H. et al., "Management of Flexible Schema Data in RDBMSs—Opportunities and Limitations for NoSQL—", *7th Biennial Conference on Innovative Data Systems Research (CIDR '15)*, (Jan. 4-7, 2015).
"Querying JSON with Oracle Database 12c: Release 2", Oracle White Paper, (May 2017).
Drake, M. D. et al., "Oracle Database 12c JSON Document Store", (May 4, 2015), publication date unknown; date retrieved from google.
Schwartz, B., "JSON Support in PostgreSQL, MySQL, MongoDB, and SQL Server", Orange Matter, (Feb. 10, 2017).
Buckler C., "How to Use JSON Data Fields in MySQL Databases", SitePoint, (Mar. 24, 2021).
Jayachandran, U. et al., "Getting started with JSON features in Azure SQL Database and Azure SQL Managed Instance", Microsoft Docs, (Apr. 19, 2020).
Mayuram, J., "Technology Pairings: JSON Documents and Databases", The New Stack, (Feb. 4, 2015).
Jadhav, Y. et al., "Using JSON with MySQL 5.7-compatible Amazon Aurora", AWS Database Blog, (Feb. 15, 2018).
Esposito, D. "How to Query JSON Data with SQL Server 2016", Visual Studio Magazine, (Jan. 23, 2018).
Adams, D., "Oracle XML DB Developer's Guide, 12c Release 1 (12.1)", Oracle, (Dec. 2016).

* cited by examiner

BIDIRECTIONAL MAPPING OF HIERARCHICAL DATA TO DATABASE OBJECT TYPES

BACKGROUND

Many types of data can be stored in a database system. Examples of well-recognized datatypes that are natively used in almost every database systems include strings, numbers, and dates. These database-specific types are well-integrated into the functioning of the database system such that database mechanisms, protocols, and procedures are able to read and write to these datatypes. For example, SQL (structured query language)-based tools are able to access database tables that store content using recognized database datatypes. The database may also include custom object types that are object-based representations of data content.

Outside of a database system, other data formats and types are also commonly employed in numerous computing contexts. For example, JSON (JavaScript Object Notation) is a lightweight data-interchange format that is very commonly employed for, e.g., browser-server communications. XML (extensible markup language) is an example of a markup language that allows encoding of documents into a standard format useable by a wide array of computing devices and contexts.

It is often desirable to allow database systems that employ database-specific data formats, such as custom database object types, to be able to interact with other computing systems that use non-database specific formats. The problem is that, conventionally, custom code needs to be written to allow the interchange of content in a database-specific format in a database and a non-database format outside of the database. The custom code may be included in the database (e.g., using the PL/SQL language) or in a system outside the database (e.g., using JAVA or C). This approach of requiring custom code is highly inefficient, especially given that the software code may need to be customized for each and every class of object sought to be interchanged between the multiple systems.

What is needed, therefore, is a method and/or system that overcomes these problems, and which more efficiently implements data interaction between a database system and a non-database system.

SUMMARY

According to some embodiments, a system, method, and computer program product is provided that performs bi-directional mapping of hierarchical data (e.g. JSON, XML) to database object types (e.g., user defined database object types). By providing a generic general-purpose bi-directional mapping between JSON and database object types, this permits productivity increases, reduces human errors, and provides added value for users of a database system.

Other additional objects, features, and advantages of the invention are described in the detailed description, figures, and claims.

BRIEF DESCRIPTION OF FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

According to some embodiments, a system, method, and computer program product is provided that implements bi-directional mapping of hierarchical data (e.g. JSON, XML) to database object types (e.g., user defined database object types).

Figure 1:
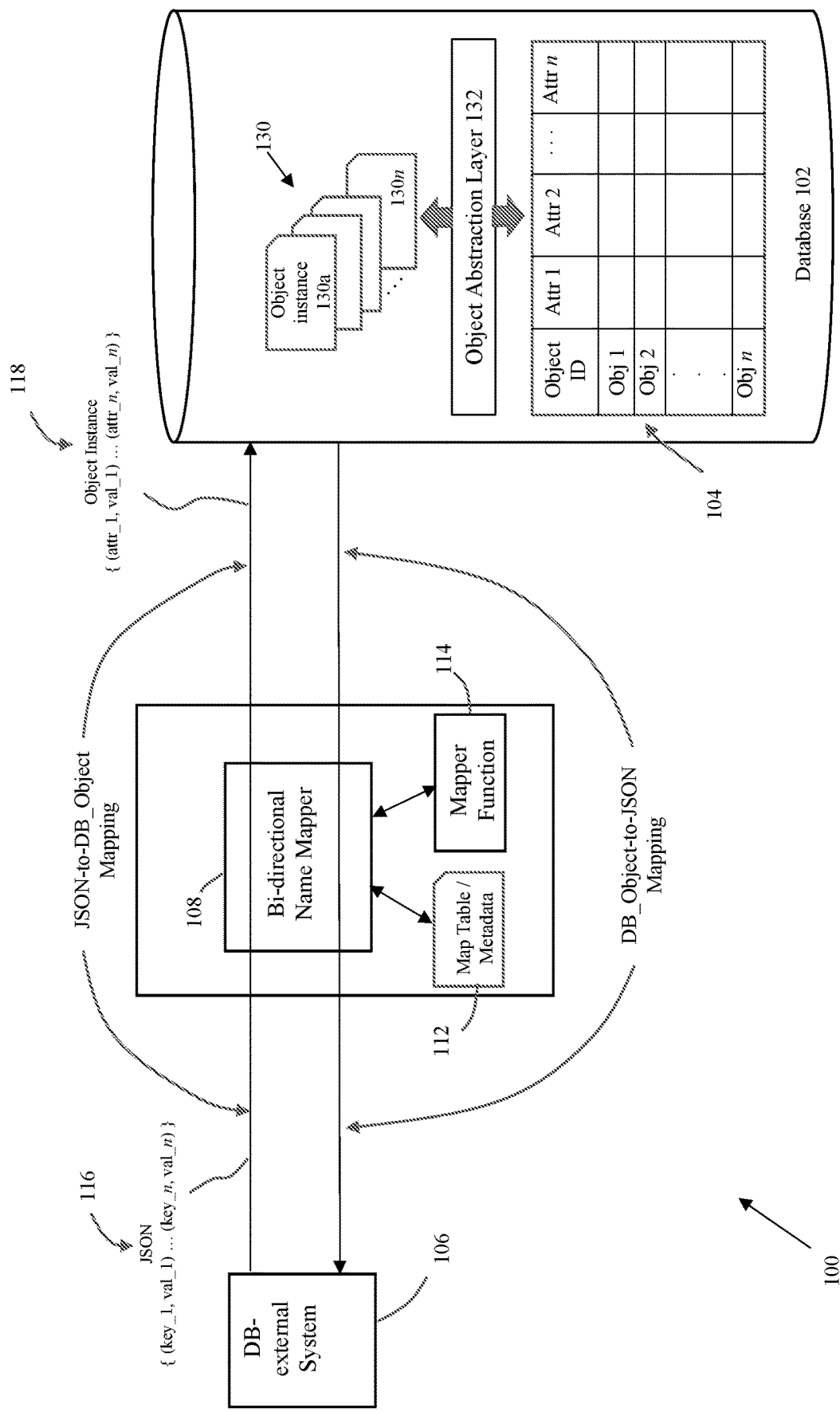
FIG. 1 illustrates a system to implement some embodiments of the invention.

FIG. 1 illustrates a system 100 to implement some embodiments of the invention. System 100 includes a database 102 having one or more database storage structures, such as database table 104. The table 104 in a relational database is organized with data elements stored within a set of rows and columns, and each data element is stored within an intersection of a given row and a given column. The columns are defined according to a given schema to identify and/or define a set of attributes for a data item, with the one or more columns identifying respective attributes for the data item. Each row is typically used to store information for a separate data item, with attribute data for that data item stored within the appropriate column for that data item's row.

In some database systems, objects 130 can be implemented as object types, such as for example, user-defined types that make it possible to model real-world entities (such as customers and purchase orders) as objects in the database. Each object instance 130a-n corresponds to a separate data item of the corresponding object type. Such object technology can be implemented as a layer of abstraction built onto the database system's relational technology. New object types can be created from any built-in database types and any previously created object types, object references, and/or collection types. Metadata for user-defined types is stored in a schema that is available to SQL, PL/SQL, Java, and other published interfaces. Object types and related object-oriented features such as variable-length arrays and nested tables provide higher-level ways to organize and access data in the database. Underneath the object layer, data is still stored in columns and tables of table 104, but one is able to work with the data in terms of the real-world entities, such as customers and purchase orders, that make the data meaningful. Instead of thinking in terms of columns and tables, a query to the database can be used to simply select a "customer".

The object type definition can server as a schema for all instances of that object type. An object type instance contains the actual data values. In some embodiments, in contrast to JSON, the object type instance does not have to repeat the field names because there is the type definition serving as a schema. Object types are also used as input/output parameters for functions and procedures allowing users to modularize code around custom types. It is noted that an object type may contain other object types. The type containment is recursive, e.g., there is no max level of nesting in some embodiments.

Internally to the database system, an object abstraction layer 132 implements the objects based upon the underlying relational structure of the database. In some embodiments, an object type is a user-defined composite datatype representing a data structure and functions and procedures to manipulate the data, as relative to the underlying rows and columns within the database table. This allows the object data types to be defined relative to the database, and to store the objects in columns in relational tables, which enables one to extend the system built-in types with user-defined ones. The database can also create object views of existing relational data to represent and access this data according to an object model. In addition, the object data can be stored in object tables, where each row is an object.

Outside of the database, one or more external computing systems 106 may employ non-database data formats and types. For example, the external computing system may employ JSON as its preferred format for data management and storage. JSON is a common data format for schema-flexible semi-structured data, and is currently considered the dominant data format for information exchange between web-browsers and web-servers, and is also heavily used in the JavaScript language. JSON typically has no schema which means a user is free to choose arbitrary key/value pairs. For the purposes of illustration, the following description may refer to JSON when discussing non-database datatypes. It is noted, however, that the use of JSON is for illustrative purposes and is not intended to limit the scope of the invention from encompassing other applicable non-database types and formats (such as XML). Therefore, while the JSON data model may be used to illustrate how the inventive mapping concept works, the inventive approach can also be applied to other hierarchical formats such as XML.

Since both JSON and database object types may serve a similar purpose in some circumstances, e.g., to bundle values belonging to one entity, embodiments of the present invention can therefore provide a method and mechanism implementing the conversion of one to the other.

Embodiments of the invention provide a mapping framework to map hierarchical data and fragments to and from object types (e.g., user-defined and system-defined object types in the database). This approach allows users of the database object types to efficiently serialize and de-serialize data to the universally understood data formats, such as JSON and XML, which are both prevalent in modern (e.g., web) applications stacks. This approach also facilitates users of the JSON features to more efficiently process the JSON data in a database programming language (such as PL/SQL).

Within the mapping framework, a bi-directional name mapper 108 is employed to map JSON data 116 into database objects 118, and vice versa. As discussed in more detail below, the bi-directional name mapper 108 may employ map table/metadata 112 and/or a mapper function 114 (e.g., for custom name mapping) to facilitate mappings between JSON and database object types. This means that JSON data 116 may be mapped in a first direction into database object types 118. In the other direction, database object types 118 may be mapped to JSON-based key-value pairs.

Figure 2:
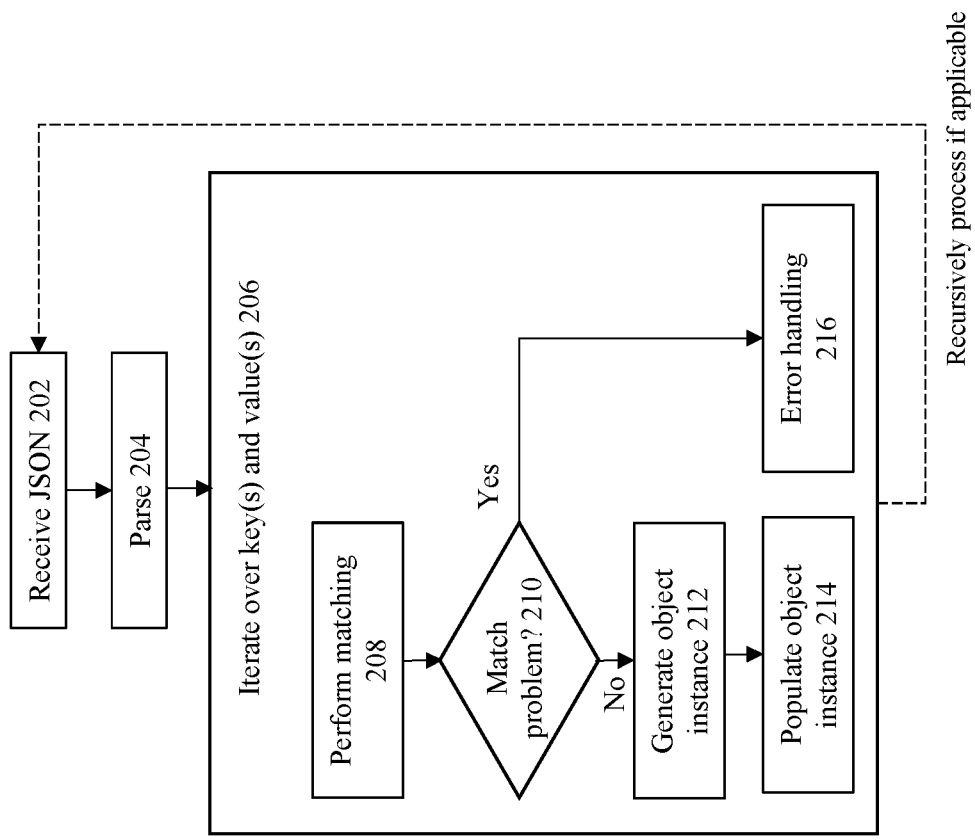
FIG. 2 shows a flowchart of an approach to perform JSON to object type mappings according to some embodiments of the invention.

FIG. 2 shows a flowchart of an approach to perform JSON to object type mappings according to some embodiments of the invention. At 202, JSON-based data is received for processing. A SQL statement format can be used in some embodiments to provide a JSON input, as illustratively described in more detail further below.

It is noted that while the SQL2016 standard does provide for a JSON_VALUE function to extract one scalar value out of a JSON input, this would only return predefined scalar SQL data types such as NUMBER, VARCHAR2, DATE, TIMESTAMP, CLOB, etc. However, the present embodiments of the invention are usable to also return predefined or user-defined object types.

At 204, the received JSON data is then parsed to identify the key-value pairs that are present within the data. Given the key-value pairs, the embodiments of the present invention will then know the fields that may be present for which conversion to an object type is to be performed. Therefore, at 206, iteration is performed over identified key-value pairs, where for a given key of a key-value pair, the processing identifies a corresponding member of the appropriate object type.

At 208, a matching operation is performed to identify a corresponding object type for a key-value pair. This is performed, for example, by checking a scalar value within the JSON to try and identify a comparable/exact scalar value within a database object type. When the value of a JSON key/value pair is not scalar (e.g., it is either a JSON object or JSON array) then the mapping algorithm recursively operates on the nested object/array and the embedded (nested) type of the object type instance (e.g., where the object type contains another object type).

A data dictionary within the database may be checked to determine whether an object type has been defined that corresponds to the specific key under analysis. The data dictionary is a structure common in many databases that store definitional metadata for the database system.

At least some or all of the matching operations may be performed during semantic analysis of a query (e.g., during query compilation). At this stage, object type definitions are known and can be looked up from a metadata dictionary. This allows raising a compile time error if the user specified an unknown (or ambiguous) object type.

At 210, a determination is made whether or not the key under examination exists with respect to the database (e.g., whether the key can be identified from the data dictionary). If the object type exists the query goes into execution.

At 212, an empty object type is initially created with all field values being SQL nulls. When parsing the JSON data, the processing compares the JSON key names with the SQL names used in the type definition. Thereafter, at 214, the object instance is populated with the JSON values for the appropriate field within the database object type.

The above processing may be applied in a recursive and/or looped manner as applicable. For example, in certain situations where the value of a JSON key/value pair is a nested object (e.g., where the object type contains another object type), then the processing may be operated recursively to process the nested object type (as shown by the dashed line in the figure).

By way of an illustrative example for the above sequence of steps, consider the following example statement that is used to define a database object type:

```
CREATE TYPE Employee_Typ AS OBJECT (
    name VARCHAR2(100),
    empid NUMBER,
    location VARCHAR2(50),
    manager VARCHAR2(100)
);
```

This statement defines an object type ("Employee Typ") that includes various SQL values, including a "name" value that is defined to be a VARCHAR2, an "empid" value that is a number, a "location" value that is a VARCHAR2, and a "manager" value that is defined to be a VARCHAR2. The object type definition can serve as a schema for all instances of that object type. This statement would create one or more entries within a database's data dictionary corresponding to the "Employee Typ" object type, as well as information in the data dictionary pertaining to the "name VARCHAR2 (100)", "empid NUMBER", "location VARCHAR2(50)", and "manager VARCHAR2(100)" portions of that statement.

Assume that a SQL statement is later received that provides a set of JSON data. For example, consider the following example of a SQL statement format that can be used in some embodiments to extract an object type output from a JSON input:

```
SELECT JSON_VALUE('{name:"Beda", empid : 77986, location:"HQ", manager:"Vikas"}', '$' RETURNING Employee_Typ) FROM DUAL;
```

In this example, the JSON values are provided as a set of key-value pairs within the statement. Here, the parsing action would have identified the following the key-value pairs, including: (a) key=name, value="Beda"; (b) key=empid, value=77986; (c) key=location, value="HQ"; and (d) key=manager, value="Vikas". The path expression '$' selects the entire input JSON data. This simple expression presents the values as individual data values; however, the values that are received as inputs may also be arrays or other collections of multiple data values.

Figure 3:
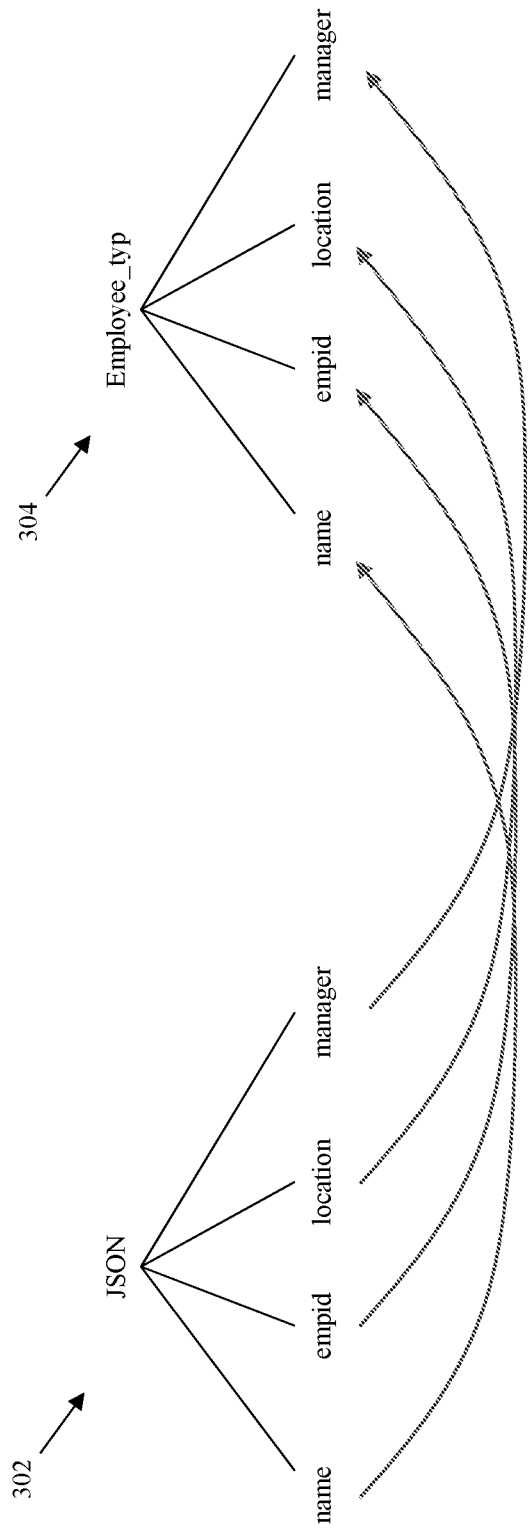
FIG. 3 illustrates a tree-based mapping procedure.

Matching can be performed to match these key-values to a given object type defined within the database's data dictionary. For example, as illustrated in FIG. 3, a tree-based mapping procedure can be implemented, whereby each key corresponds to a leaf from a JSON tree structure (e.g., a JSON tree 302 having a first leaf node "name", a second leaf node "empid", a third leaf node "location", and a fourth leaf "manager"). In a similar manner, the object types within the database may also be considered as tree structures, such as tree 304 for the employee_typ object type. Each leaf node for a given tree is matched up against a leaf node from the other tree to identify an object type match for the JSON data. In this particular example, there is an exact one-to-one match between the two trees. However, it is noted that in some embodiments, the trees do not need to be an exact match, e.g., where one tree has more or less leaf node members than the other tree.

Figure 4:
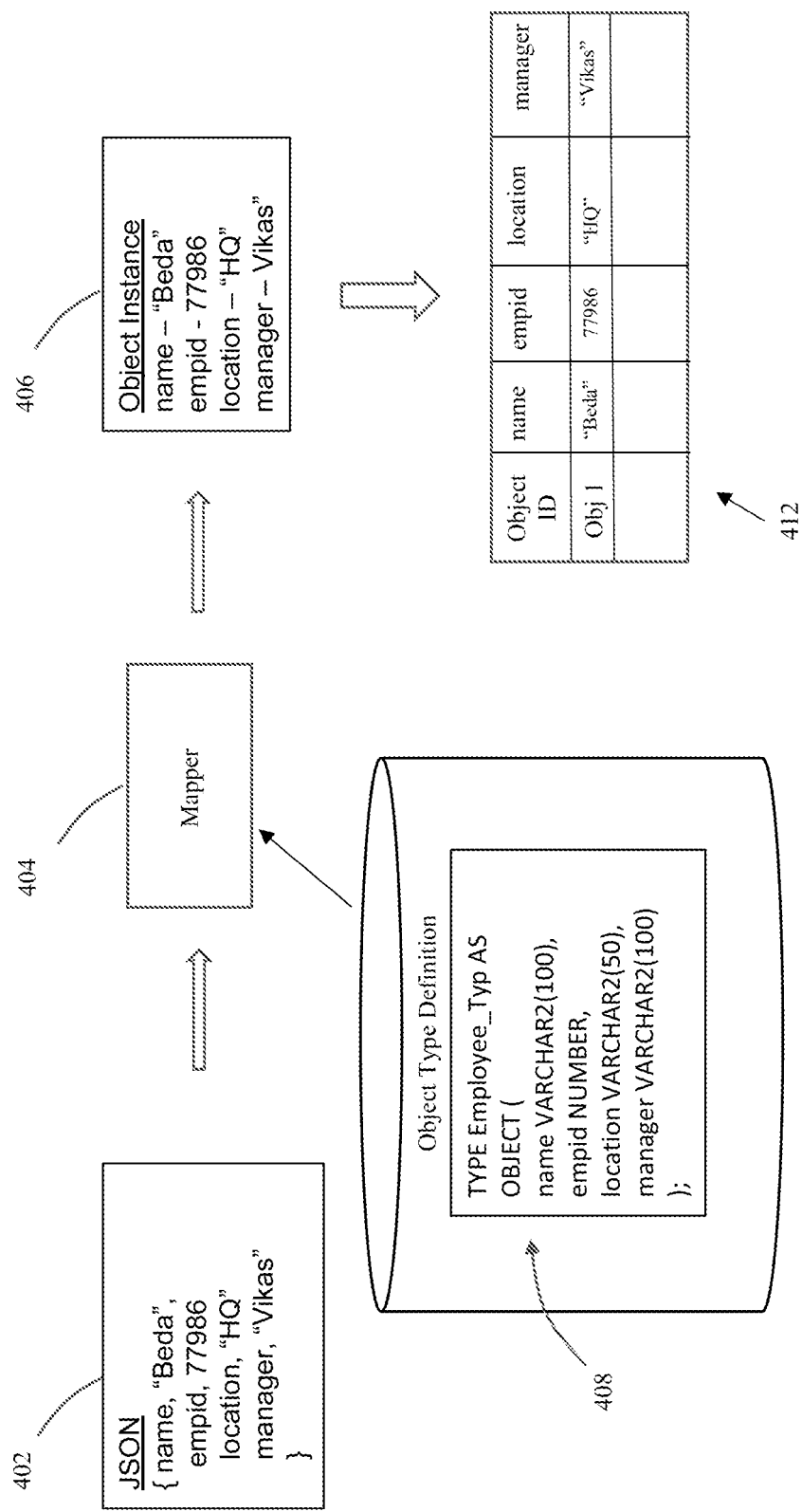
FIG. 4 illustrates an instance of an appropriate object type that is populated from JSON data.

As illustrated in FIG. 4, an instance 406 of the appropriate object type 408 can then be populated from the JSON data 402. In particular, the mapper 404, after performing the appropriate matching lookup from data in the data dictionary 410, will create the object instance 406 for object type 408. Each key-value pair within the JSON data 402 is then identified, and provided/populated within the appropriate field for the object instance 406. Internally within the database, a relational database structure, such as table 412, may be employed to hold the object instance 406. For example, the object instance can be used to populate a row within database table 412, and where the individual values correspond to values that are placed within separate columns corresponding to the respective object attribute.

As previously noted, the matching action at step 208 of FIG. 2 checks whether the names match the JSON value that is used to set the value in the object type instance. In some embodiments, the matching action can be performed in either a case sensitive or case insensitive manner.

In addition, a check can be made regarding type compatibility/conflict. For instance, as illustrated in the previous example, a JSON value can be used to set a SQL field in the object type instance. An example for a type mismatch would be a non-numeric JSON String (e.g. 'BEDA') where the attempt is made to set it as a value for a SQL number, which would cause an error condition in some embodiments.

If step 210 indicates a matching problem, then at 216, error handling is performed. This may occur, for example, if there is at least one key/value-pair in the JSON data that does not map to any object type name. This may also occur, for example, when there are names in the object type which have not been set. This can be caused, for example, when: (a) there was not corresponding key/value-pair in the JSON data; and (b) the corresponding key/value-pair could not be used because of a type conflict. Both cases may result in errors and an error handler can be defined to handle the error.

In one embodiment, a default action is to "IGNORE ON MISMATCH," in which the error is suppressed and the object type instance is returned it its current state (e.g., where some or all fields could be NULL). Alternatively, an action for "ERROR ON MISMATCH" will report the error. For example, this mode can be configured to only report errors of kind errors involving missing data and/or extra data.

The above description pertains to mapping from JSON data to database object type data. This document will now describe the mapping process in the other direction, from object types to JSON. The mappings in this direction suffer from less error conditions than mappings in the other direction, since an object instance can only exist if the type for that object instance has been defined within a database, e.g., definitional metadata already exists in the data dictionary for the object type to be mapped. In addition, since JSON is merely a set of keys and values without a fixed schema, there will likely not be a possibility of a mismatch since any set of attribute data for an object instance can be converted into any sequence/string of keys and values in JSON.

Figure 5:
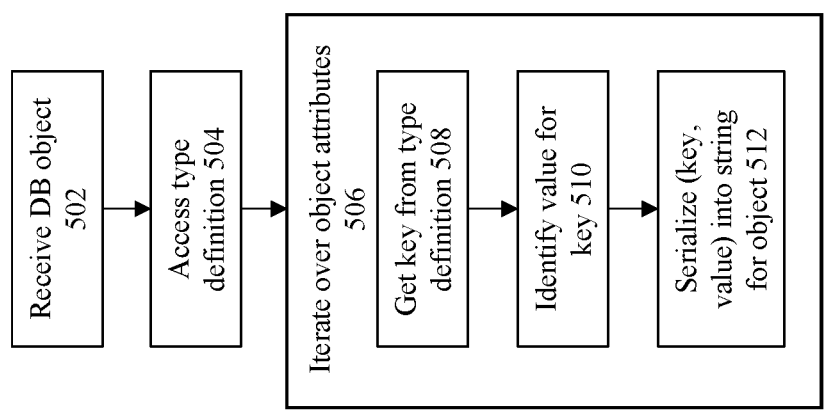
FIG. 5 shows a flowchart for mapping from object types to JSON. At 502, a database object is received for mapping into JSON.

FIG. 5 shows a flowchart for mapping from object types to JSON. At 502, a database object is received for mapping into JSON. A SQL statement may be employed to specify the object type that is to be mapped to the JSON. At 504, metadata for the object type may be accessed to provide one or more definitions that may be used for the mapping. For instance, metadata within a data dictionary may be accessed to facilitate the mapping process. In addition, as discussed in more detail below, custom name mapping data may be accessed to perform the mappings.

At 506, the processing will iterate over the object attributes for the object, where each value is turned into a key value pair. At 508, the key for a given value is identified, e.g., by accessing the metadata within a data dictionary for the defined type of the object instance. At 510, the value for that key is identified from the object instance. Thereafter, at 512, serialization is performed to serialize into a string.

While not shown in the figure, it is noted that the above processing may be applied in a recursive and/or looped manner as applicable. For example, when a nested object is being processed, the processing may be operated recursively to process the nested object type.

As an illustrative example, consider the following SQL statement:

SELECT JSON_OBJECT(programmer) FROM tab1;

In this illustrative example, the term "programmer" corresponds to an instance of the object type "Employee Typ" that was defined above. This statement would therefore returns the following result:

{"NAME":"Beda",
"EMPID" : 77986,
"LOCATION":"HQ",
"MANAGER":"Vikas"}

This result is accomplished because, as shown in FIG. 4, the type definition 408 for this object type has been stored into the data dictionary 410. As such, that definition metadata can be accessed to identify the "keys" associated with instances of this object type. The keys would correspond to the values defined for the object type, e.g., "name", "empid", "location", and "manager". For each of these keys, the values for that key is identified, e.g., by extracting those values from the object instance 406. Since object type instances are associated with a schema (the type definition) there is no mapping problem; the SQL names used in the type definition becomes the keys of the key/value pairs in JSON. It is noted that because of this, the names in the above example are uppercased. If the object types contain nested object type then, the nested JSON objects can be created in a recursive manner.

In some embodiments, custom name mapping may be performed, e.g., where there is a desire to not use the same names in JSON and object types or columns names (e.g., SQL names). For example, this may occur if the SQL name 'CUSTOMERID' should map to 'customerId' (case difference) or 'CUST_NAME' should match 'person'. This is especially relevant when relational legacy tables and object types are exposed to a modern stack (e.g. mobile/web) with JSON as data format and modern developer prefers lowercase/camel case names. This approach is not limited to object types but is also applicable to SQL table/column names as well.

Figure 6:
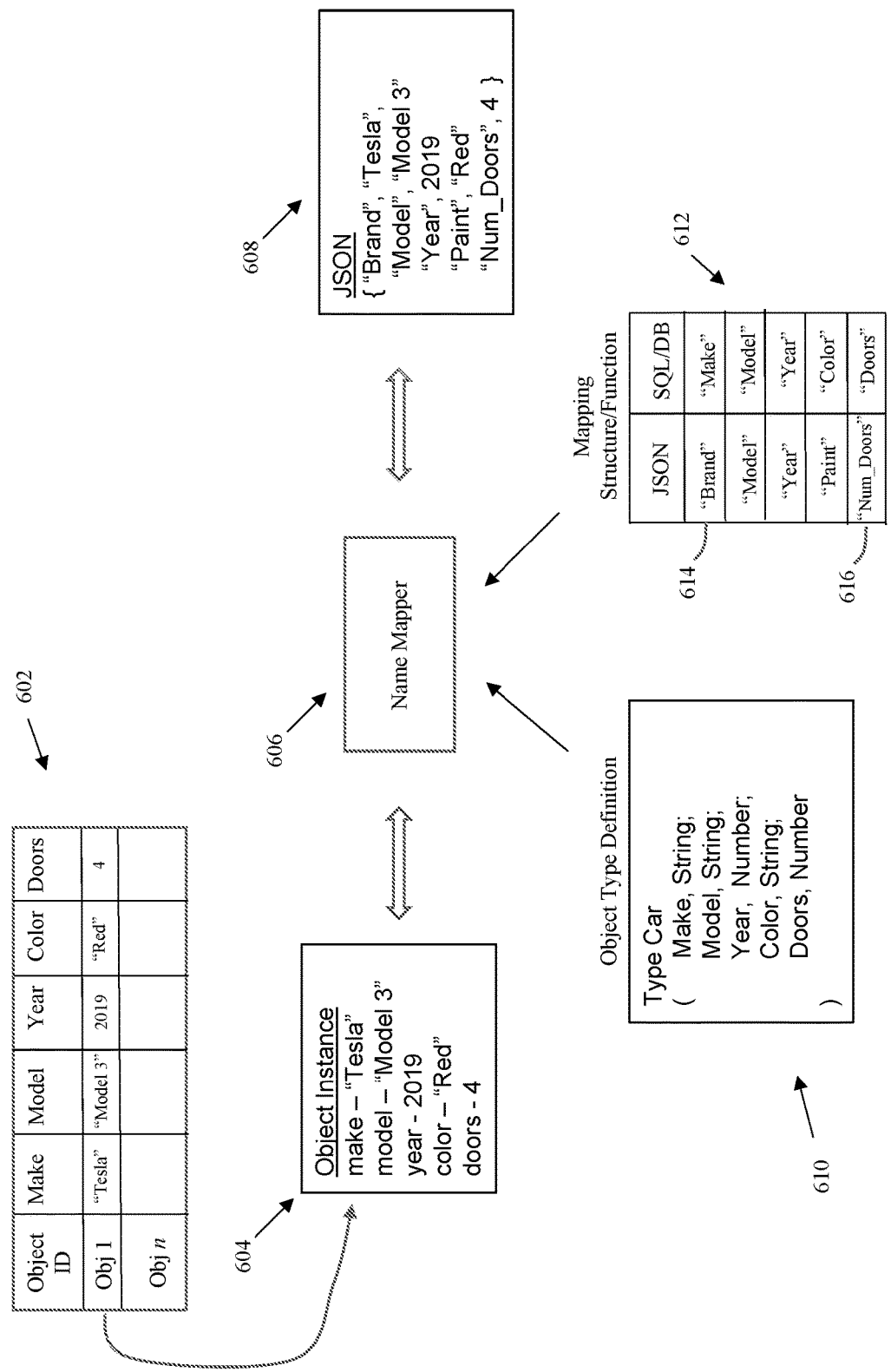
FIG. 6 illustrates a name mapper that bi-directionally maps SQL names and JSON names.

Therefore, some embodiments provide a name mapper that bi-directionally maps SQL names and JSON names. FIG. 6 provides an illustration of this concept. Here, a database object type 610 is defined in a database to include various attributes, including: (a) "make" attribute that is defined to be a string; (b) "model" attribute that is defined to be a string; (c) "year" attribute that is defined to be a number; (d) "color" attribute that is defined to be a string; and (e) "doors" attribute that is defined to be a number. An object instances 604 of this type would be presented in the database within a relational table 602 as a row within the table.

Assume that it is desired for these attribute names to be defined to map to different names in a JSON representation. For example, assume that it is desirable to map the attribute name "make" to the key "brand" in its JSON representation 608, and also to map the attribute name "doors" to the key "num_doors" in JSON 608.

As shown in FIG. 6, a mapping structure/function 612 can be provided to implement the name mapping. Here, entry 614 in structure 612 maps the attribute name "make" to the key "brand" in its JSON. Similarly, entry 616 maps the attribute name "doors" to the key "num_doors" in JSON. When name mapper 606 operates to perform mapping between object type and JSON, the mapping structure 612 is checked to perform the name mapping. As can be seen in the figure, the object instance 604 refers to the attribute name "make" while its equivalent JSON refers to key name "brand". Similarly, the object instance 604 refers to the attribute name "doors" while its equivalent JSON refers to key name "num_doors".

Various approaches can be taken to implement the name mapper mechanism, including a catalog-based approach and a callback-based approach.

The catalog-based name mapper can be implemented as an enumeration of name pairs (SQL-Name, JSON-Name). Such JSON text can be created by various approaches, such as a JSON generation function over a two column table (jsonNameCol, sqlNameCol) or other approaches to generate JSON (e.g., an applications programming interface (API) for a PLSQL JSON DOM (document object model)).

The syntax of a database statement (e.g., JSON_VALUE and JSON_OBJECT) can be extended to accept such JSON text as an optional input to define the mapping catalog:

SELECT JSON_VALUE(inp, '$'
RETURNING Employee_Typ (USING MAPPING :M))
FROM DUAL;
SELECT JSON_OBJECT(emp (USING MAPPING :M))
FROM tab1;

Here, the clause USING MAPPING is followed by an expression of a string datatype (e.g. VARCHAR2 or CLOB/BLOB), which can be a constant string literal, a subquery or a bind variable as in the example above. If the mappers (:M) are compile time constants (e.g. string literals), then one can optimize the execution of the mapping by caching the mapping results in memory (e.g. in a hash table). This would allow the system to avoid parsing and processing the mapper's data repeatedly. When executing JSON_VALUE or JSON_OBJECT with a mapping clause the JSON mapper information is parsed once, stored in one hashtables and used across all rows. The hashtable for JSON_VALUE uses the JSON name as key and the SQL name as value. The hashtable for JSON_OBJECT is the other way around. For frequently used mappers, the hashtable can be kept in a cache to reuse it not only across rows but also across different operations. The catalog based mapper, in some embodiments, enumerates all name pairs, which allows complex name mappings like "xyz" to map to "blabla" but cannot handle unknown names in some embodiments. An unknown name in some embodiments will cause the mapper to raise an error or to use the original name.

With the callback-based name mapper, in contrast to the previous enumeration approach, this allows logic to be provided to return a name given the other name. For example, a type called NAME MAPPER TYPE can be provided which defines the following functions to get a SQL name and/or to get a JSON name.

The following provides an illustrative example of a statement that includes these functions:

```
CREATE TYPE NAME_MAPPER_TYPE AS OBJECT (
MEMBER FUNCTION getSQLName (jsonName VARCHAR2)
RETURN VARCHAR2 DETERMINISTIC,
MEMBER FUNCTION getJsonName (sqlName VARCHAR2)
RETURN VARCHAR2 DETERMINISTIC
) NOT FINAL;
/
```

In some embodiments, the default type body just lowercases or uppercases the input name. In some embodiments, a subtype can be created that overrides the implementation by custom code.

At compile time, the instance can be checked for application of the above, e.g., whether the instance is a subtype of the name mapper type as defined above. Also, for performance reasons in some embodiments, the instance can be shared across operations and/or even optimized internally by the use of hash tables.

The mapping mechanism described above can also be applied to other programming languages. For example, the PLSQL programming language may be used in conjunction with the current invention. In particular, a Record type can be treated like an object type, where instead of object member names and types, there are record names and types. For nested tables, a mapping is made to JSON arrays. Varrays can be mapped to JSON arrays. In addition, associative arrays can map to JSON objects, since the key names are unique in both cases.

Some embodiments provide an approach to resolve possible naming conflicts when handling hierarchical object data. To explain, consider the type definitions 702 shown in FIG. 7A. Here, the top level object type "vehicle" in the hierarchy includes attributes "make", "model", and "year". The object hierarchy also includes two subtypes, including subtype "car" and subtype "plane". Each of these subtypes are associated with their own individual attributes, e.g., where the "car" subtype corresponds to an attribute "doors" and the "plane" subtype corresponds to the "wingspan" attribute.

In addition, the subtypes may inherit attributes from the parent type. Therefore, the "car" type can actually be associated with attributes "doors", "make", "model", and "year". Similarly, the "plane" type can actually be associated with attributes "wingspan", "make", "model", and "year". As a result, it should be noted that there is an overlap for the attributes between the "car" and "plane" types.

Figure 7A:
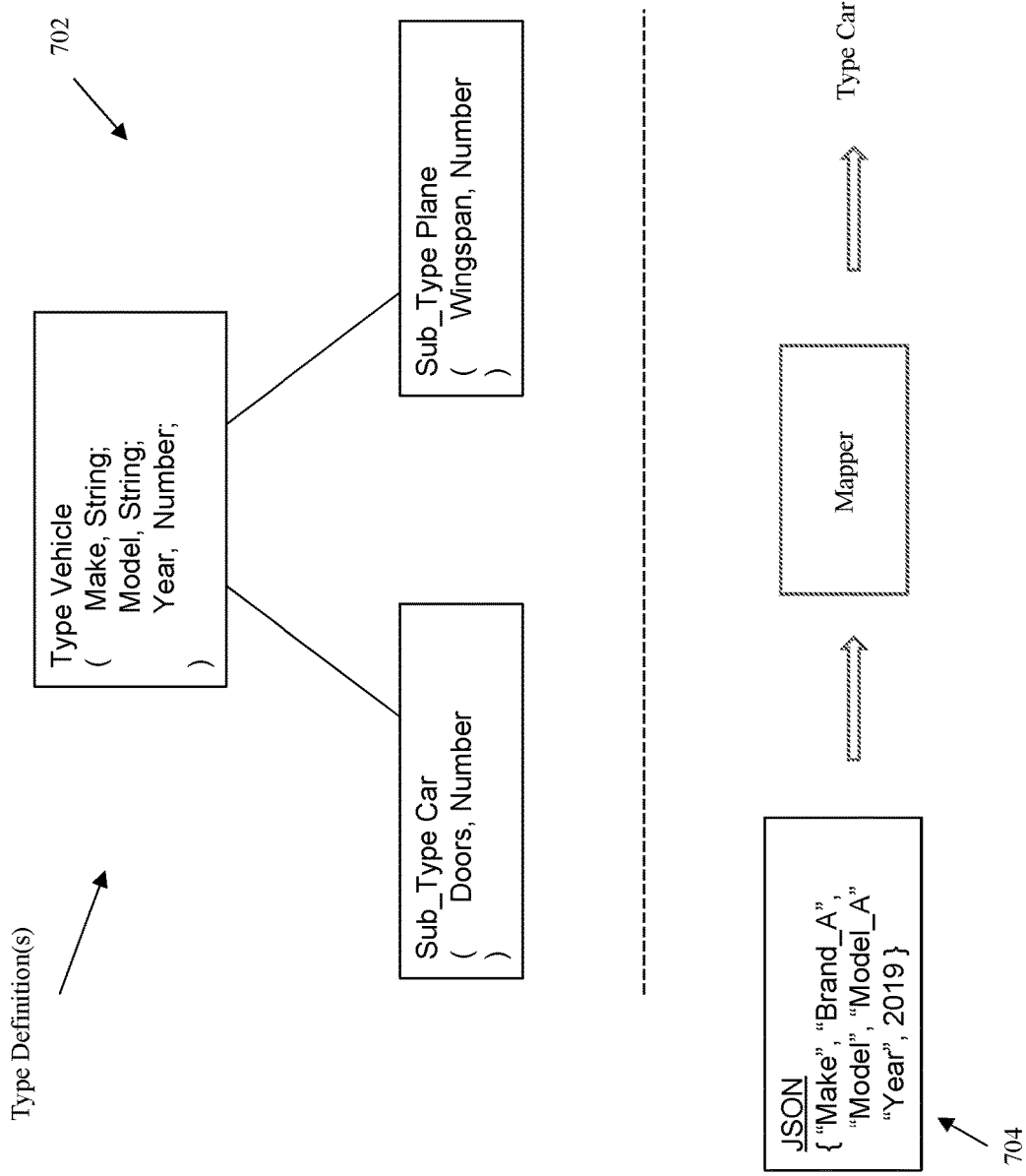
FIGS. 7A-7B illustrate mappings of hierarchical object types.

A problem that may arise is that JSON data may be received for mapping which may potentially map to either the "car" type or the "plane" type, and therefore a conflict may arise if the wrong type is initially chosen to hold the JSON data. This is illustrated at the bottom of FIG. 7A, the JSON data 704 includes key-value pairs corresponding to the keys "make", "model", and "year". In this situation, the mapper will be unable to determine which of the object subtypes correspond to the JSON data.

Figure 8:
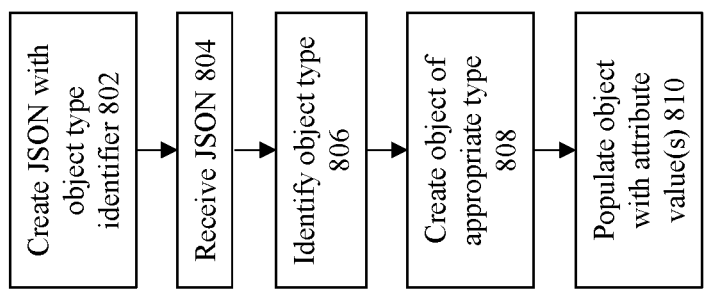
FIG. 8 shows a flowchart of an embodiments that includes an object type identification within JSON data.

This problem is solved according to some embodiments of the invention by including an object type identification that is included within the JSON data. FIG. 8 shows a flowchart of an approach to implement this aspect of the invention. At 802, the JSON data is created having a field that explicitly identifies the object type. For example, an "object_type_name" field may be created within the JSON that specifies a particular object type for the JSON data. At 804, that JSON data is then received for mapping/processing by the database system, e.g., using the SQL statement as illustrated and described previously in this document.

At 806, the JSON data is analyzed to determine whether it includes the field that identifies the object type. If so, then at 808, an instance of the correct object type is created. The object instance is, at 810, then populated with the JSON data.

Figure 7B:
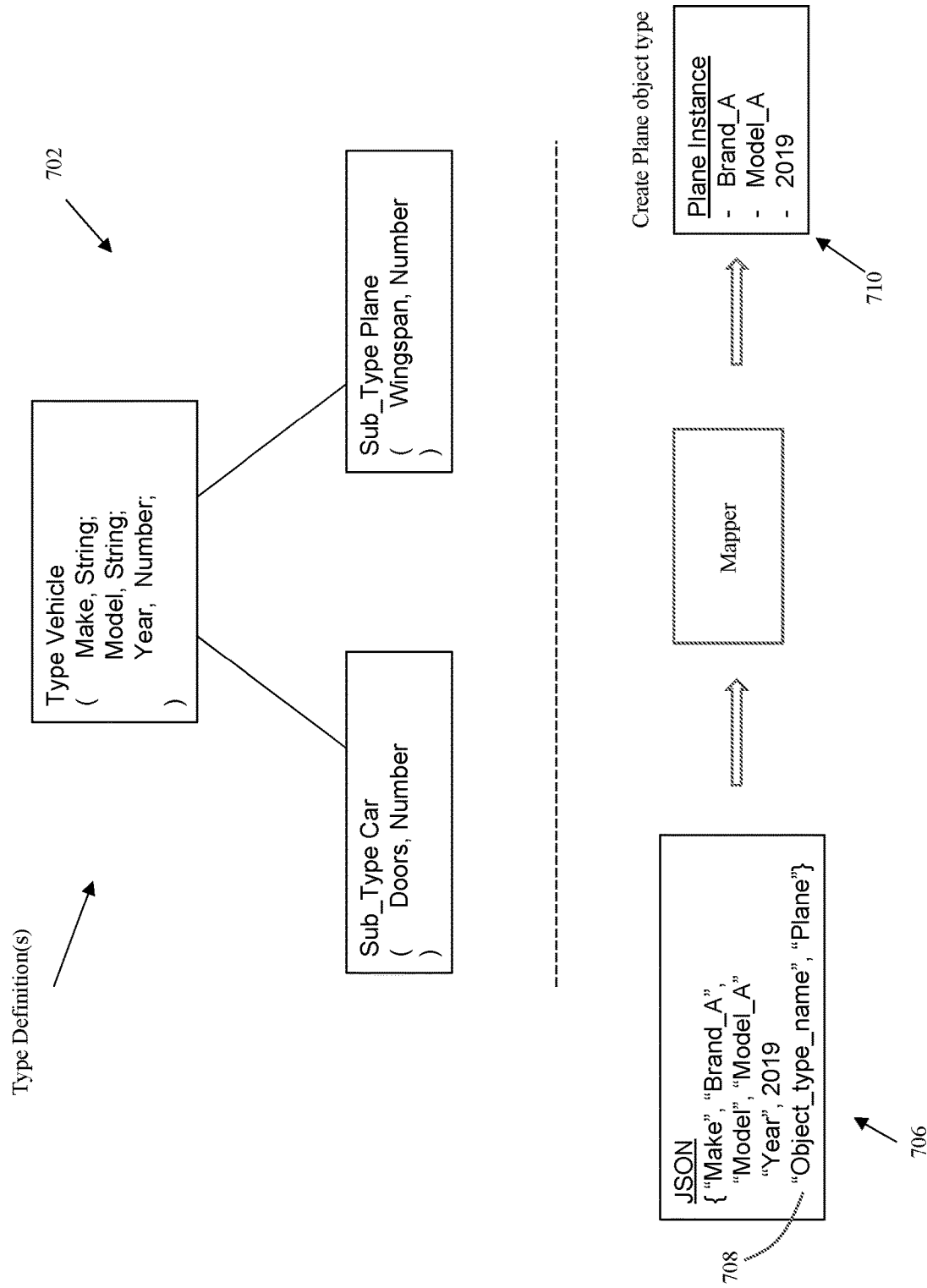

This process is illustrated in FIG. 7B. Here, the JSON data 706 includes object type identification data 708 which identifies the JSON as being associated with the "plane" type. As such, the mapper will create an object instance 710 of the "plane" type. The key-value pairs from within the JSON data 706 will then be used to populate the attribute data for the new object instance 710.

Various type of processing may be applied to facilitate this aspect of the invention. For example, one issue is the JSON data may not be received in any particular order, and hence the object type identification data may arrive after the rest of the key-value pair data. As a result, the system that intakes the JSON data may not know upfront as the data arrives which object type is associated with the data. This issue can be handled in any appropriate way according to various embodiments. For example, one approach is to employ a document object model (DOM) for the JSON data instead of or in addition to the streaming aspect of the JSON data intake. In an alternative embodiment, some form of caching may be applied to cache the streaming JSON data until the object type identification data is received.

Therefore, what has been provided is an improved approach to implement a system, method, and computer program product to perform bi-directional mapping of hierarchical data (e.g. JSON, XML) to database object types (e.g., user defined database object types). By providing a generic general-purpose bi-directional mapping between JSON and database object types, this permits productivity increases, reduces human errors, and provide added value for users of a database system. Also, because the mapping can be defined centrally in the database, application code does not need to be custom written to perform the mapping, nor will the application code be polluted with unnecessary mapping information. This makes maintenance of the mapping procedures and structures much more efficient and safe.

System Architecture Overview

Figure 9:
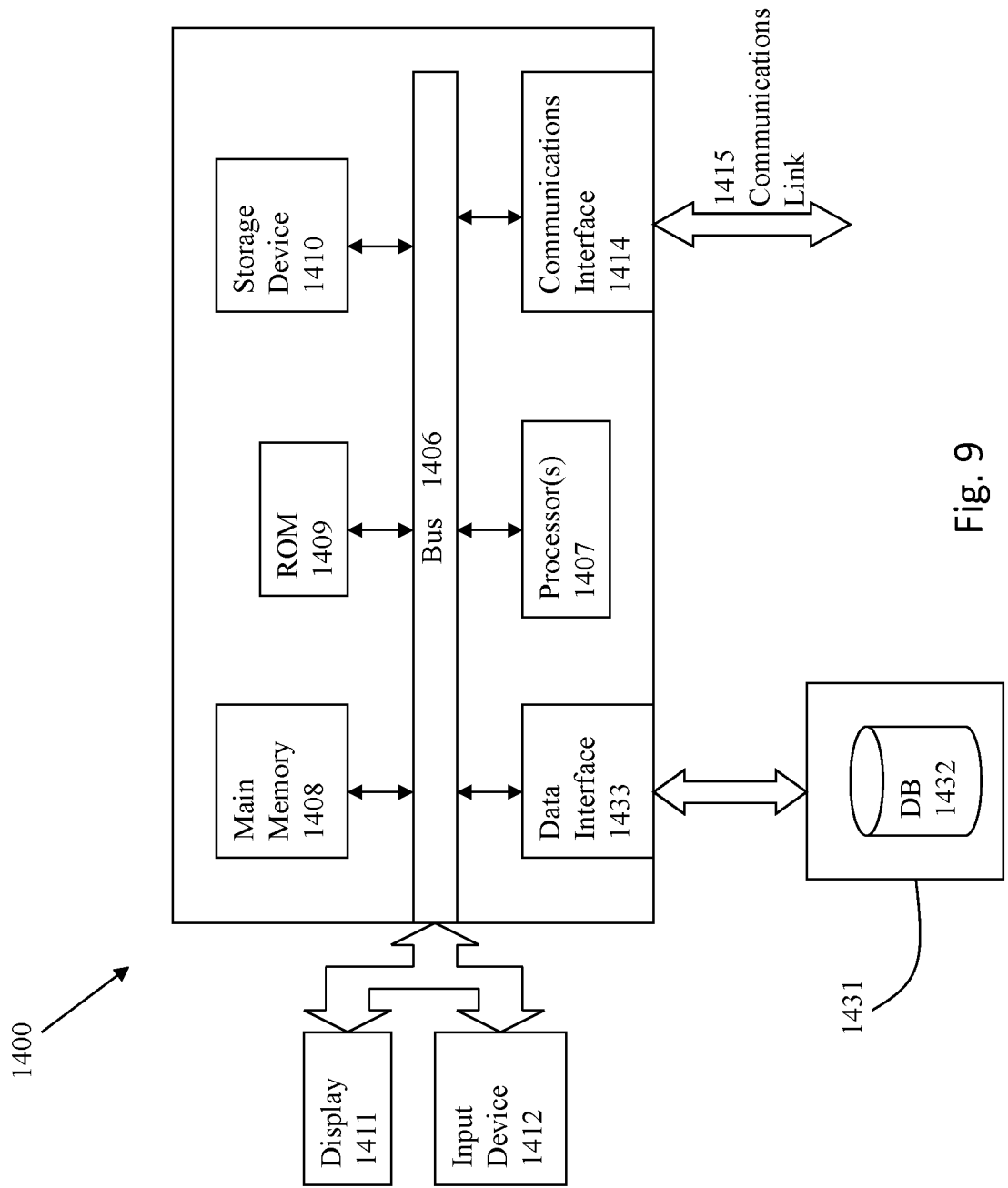
FIG. 9 is a block diagram of an illustrative computing system suitable for implementing an embodiment of the present invention.

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

Figure 10:
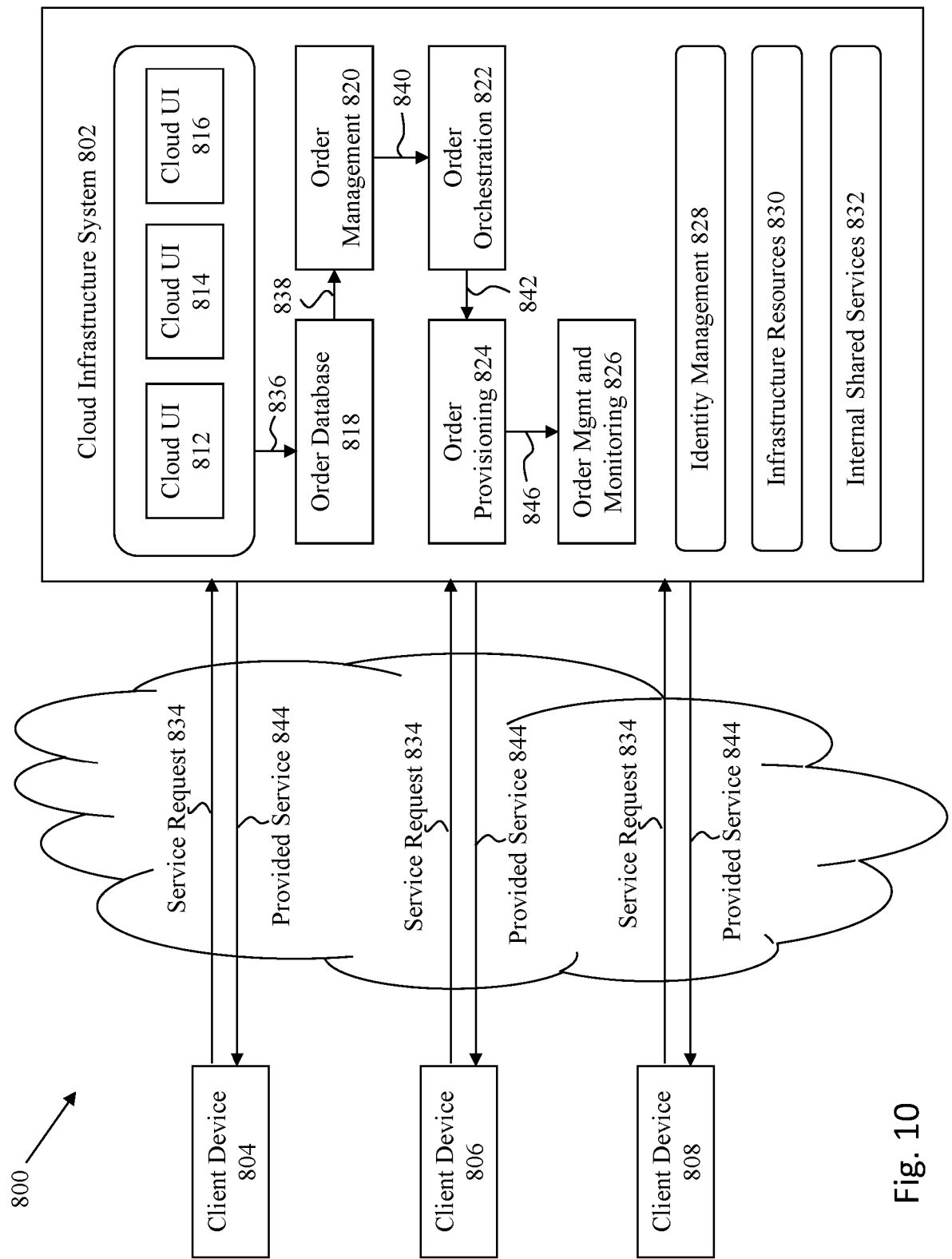
FIG. 10 is a block diagram of one or more components of a system environment in which services may be offered as cloud services, in accordance with an embodiment of the present invention.

FIG. 10 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 9. Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method, comprising:
storing object definition metadata for a database object type in a database data dictionary, the database object type corresponding to a user-defined object type in a database system, wherein an object type definition provides a schema for an object instance of the user-defined object type;
receiving, by the database system, a data stream to be mapped between the user-defined object type and hierarchical data from outside a database system;
generating the object instance of the user-defined object type in response to accessing the object definition metadata for the user-defined object type in the database data dictionary;
mapping between the hierarchical data and the object instance of the user-defined object type based at least in part on the object definition metadata stored in the database data dictionary, wherein
a tree-based mapping procedure is executed to populate the object instance of the user-defined object type by matching a first leaf node in a first tree structure for a key in a key-value pair in the hierarchical data to a second leaf node in a second tree structure representing an object attribute of the user-defined object type stored in the database system; and
performing a mismatch resolution in a first direction of a bi-directional mapping for the hierarchical data and the user-defined object type, wherein performing the mismatch resolution comprises:
identifying a mismatch between at least one key-value pair in the hierarchical data and at least one object attribute of the user-defined object type; and
resolving the mismatch at least by performing at least one mismatch resolution operation of a plurality of mismatch resolution operations, wherein the plurality of mismatch resolution operations comprises:
ignoring the mismatch with default data; and skipping the mismatch resolution in a second direction of the bi-directional mapping for the hierarchical data and the user-defined object type.

2. The method of claim 1, wherein the hierarchical data is mapped to the database object type by a process, the process comprising:
  parsing the hierarchical data to identify and store the key-value pair in a nested object or array; and
  recursively performing a matching process on the nested object or the array, wherein recursively performing the matching process comprises:
    matching the key to the object attribute for the user-defined object type, wherein the object definition metadata is accessed to matching the key to the object attribute; and
    populating an initially empty object type for the object instance of the user-defined object type with a value from the key-value pair.

3. The method of claim 1, wherein the database object type is mapped to the hierarchical data by a process, the process comprising:
  identifying the object instance for the user-defined object type;
  identifying the object attribute for the object instance of the user-defined object type based at least in part upon one or more definitions that are determined from metadata in the schema;
  determining the key for the object attribute based at least in part upon at least one definitions for the user-defined object type in the metadata;
  identifying a value for the key, wherein the value for the key corresponds to an attribute value for the object attribute; and
  serializing the key and the value to generate the hierarchical data.

4. The method of claim 1, further comprising performing a custom name mapping for at least the key in the hierarchical data and the object attribute for the user-defined object type at least by invoking a catalog-based process or a callback-based process, wherein the hierarchical data corresponds to at least one of JSON data or XML data.

5. The method of claim 1, further comprising mapping a first name for the key in the hierarchical data to a second name for the object attribute in the user-defined object type, wherein the first name for the key in the hierarchical data and the second name for the object attribute are devised to be different in the hierarchical data and the user-defined object type.

6. The method of claim 1, wherein the data is mapped bi-directionally between the user-defined object type and the hierarchical data from outside the database system.

7. The method of claim 1, further comprising resolving a naming conflict at a lower hierarchy in the hierarchy data at least by including an object type definition in the hierarchical data, wherein the hierarchical data includes object type identification data.

8. The method of claim 1, wherein the tree-based mapping procedure is implemented by:
  identifying a user-defined object type match for the hierarchical data, wherein the first tree structure includes a first number of leaf nodes;
  the second tree structure includes a second number of leaf nodes; and
  the first number is different from the second number.

9. The method of claim 1,
  wherein a component embedding within the database system maps between the hierarchical data that is stored in one or more computing systems external to the database system and the user-defined object type that is stored in the database data dictionary within the database system.

10. A system, comprising:
  a processor;
  a memory for holding programmable code; and
  wherein the programmable code includes instructions for storing object definition metadata for a database object type in a database data dictionary, the database object type corresponding to a user-defined object type in a database system, and an object type definition provides a schema for an object instance of the user-defined object type;
  receiving, by the database system, a data stream to be mapped between the user-defined object type and hierarchical data from outside a database system;
  generating the object instance of the user-defined object type in response to accessing the object definition metadata for the user-defined object type in the database data dictionary;
  mapping between the hierarchical data and the object instance of the user-defined object type based at least in part on the object definition metadata stored in the database data dictionary, wherein
    a tree-based mapping procedure is executed to populate the object instance of the user-defined object type by matching a first leaf node in a first tree structure for a key in a key-value pair in the hierarchical data to a second leaf node in a second tree structure representing an object attribute of the user-defined object type stored in the database system; and
  performing a mismatch resolution in a first direction of a bi-directional mapping for the hierarchical data and the user-defined object type, wherein performing the mismatch resolution comprises:
    identifying a mismatch between at least one key-value pair in the hierarchical data and at least one object attribute of the user-defined object type; and
    resolving the mismatch at least by performing at least one mismatch resolution operation of a plurality of mismatch resolution operations, wherein the plurality of mismatch resolution operations comprises:
      ignoring the mismatch with default data; and
      skipping the mismatch resolution in a second direction of the bi-directional mapping for the hierarchical data and the user-defined object type.

11. The system of claim 10, wherein the programmable code further includes instructions for mapping the hierarchical data to the database object type, by:
  parsing the hierarchical data to identify the key-value pair in a nested object or array; and
  recursively performing a matching process on the nested object or the array, wherein recursively performing the matching process comprises:
    matching the key to the object attribute for the user-defined object type, wherein the object definition metadata is accessed to execute the matching; and
    populating an initially empty object for the object instance of the user-defined object type with a value from the key-value pair.

12. The system of claim 10, wherein the programmable code further includes instructions for mapping the database object type to the hierarchical data, by:
  identifying the object instance for the user-defined object type;

identifying the object attribute for the object instance of the user-defined object type based at least in part upon one or more definitions that are determined from metadata in the schema;

determining the key for the object attribute based at least in part upon at least one definitions for the user-defined object type in the metadata;

identifying a value for the key, wherein the value for the key corresponds to an attribute value for the object attribute; and serializing the key and the value to generate the hierarchical data.

13. The system of claim 10, further comprising performing a custom name mapping for at least the key in the hierarchical data and the object attribute for the user-defined object type at least by invoking a catalog-based process or a callback-based process, wherein the hierarchical data corresponds to at least one of JSON data or XML data.

14. The system of claim 10, wherein the programmable code further includes instructions for mapping a first name for the key in the hierarchical data to a second name for the object attribute in the user-defined object type, wherein the first name for the key in the hierarchical data and the second name for the object attribute are devised to be different in the hierarchical data and the user-defined object type.

15. The system of claim 10, wherein the data is mapped bi-directionally between the user-defined object type and the hierarchical data from outside the database system.

16. The system of claim 10, further comprising resolving a naming conflict at a lower hierarchy in the hierarchy data at least by including an object type definition in the hierarchical data, wherein the hierarchical data includes object type identification data.

17. A computer program product embodied on a non-transitory computer readable medium, the non-transitory computer readable medium having stored thereon a sequence of instructions which, when executed by a processor, executes:

storing object definition metadata for a database object type in a database data dictionary, the database object type corresponding to a user-defined object type in a database system, wherein an object type definition provides a schema for an object instance of the user-defined object type;

receiving, by the database system, a data stream to be mapped between the user-defined object type and hierarchical data from outside a database system;

generating the object instance of the user-defined object type in response to accessing the object definition metadata for the user-defined object type in the database data dictionary;

mapping between the hierarchical data and the object instance of the user-defined object type based at least in part on the object definition metadata stored in the database data dictionary, wherein a tree-based mapping procedure is executed to populate the object instance of the user-defined object type by matching a first leaf node in a first tree structure for a key in a key-value pair in the hierarchical data to a second leaf node in a second tree structure representing an object attribute of the user-defined object type stored in the database system; and performing a mismatch resolution in a first direction of a bi-directional mapping for the hierarchical data and the user-defined object type, wherein performing the mismatch resolution comprises:

identifying a mismatch between at least one key-value pair in the hierarchical data and at least one object attribute of the user-defined object type; and resolving the mismatch at least by performing at least one mismatch resolution operation of a plurality of mismatch resolution operations, wherein the plurality of mismatch resolution operations comprises:
ignoring the mismatch with default data; and
skipping the mismatch resolution in a second direction of the bi-directional mapping for the hierarchical data and the user-defined object type.

18. The computer program product of claim 17, wherein the sequence of instructions further performs mapping from the hierarchical data to the database object type, by:

parsing the hierarchical data to identify the key-value pair in a nested object or array; and recursively performing a matching process on the nested object or the array, wherein recursively performing the matching process comprises:
matching the key to the object attribute for the user-defined object type, wherein the object definition metadata is accessed to execute the matching; and
populating an initially empty object type for the object instance of the user-defined object type with a value from the key-value pair.

19. The computer program product of claim 17, wherein the sequence of instructions further performs mapping from the database object type to the hierarchical data, by:

identifying the object instance for the user-defined object type;

identifying the object attribute for the object instance of the user-defined object type based at least in part upon one or more definitions that are determined from metadata in the schema;

determining the key for the object attribute based at least in part upon at least one definitions for the user-defined object type in the metadata;

identifying a value for the key, wherein the value for the key corresponds to an attribute value for the object attribute; and serializing the key and the value to generate the hierarchical data.

20. The computer program product of claim 17, further comprising performing a custom name mapping for at least the key in the hierarchical data and the object attribute for the user-defined object type at least by invoking a catalog-based process or a callback-based process, wherein the hierarchical data corresponds to at least one of JSON data or XML data.

21. The computer program product of claim 17, wherein the sequence of instructions further performs mapping of a first name for the key in the hierarchical data to a second name for the object attribute in the user-defined object type, wherein the first name for the key in the hierarchical data and the second name for the object attribute are devised to be different in the hierarchical data and the user-defined object type.

22. The computer program product of claim 17, wherein the data is mapped bi-directionally between the user-defined object type and the hierarchical data from outside the database system.

23. The computer program product of claim 17, further comprising resolving a naming conflict at a lower hierarchy in the hierarchy data at least by including an object type definition in the hierarchical data, wherein the hierarchical data includes object type identification data.

* * * * *

UNITED STATES PATENT AND TRADEMARK OFFICE
CERTIFICATE OF CORRECTION

| | |
|---|---|
| PATENT NO. | : 11,550,785 B2 |
| APPLICATION NO. | : 16/389304 |
| DATED | : January 10, 2023 |
| INVENTOR(S) | : Hammerschmidt et al. |

It is certified that error appears in the above-identified patent and that said Letters Patent is hereby corrected as shown below:

On the Title Page

Column 1, under Item (73) Assignee, Line 1, delete "Corporation" and insert -- Corporation, (US) --, therefor.

Signed and Sealed this
Tenth Day of October, 2023

Katherine Kelly Vidal
*Director of the United States Patent and Trademark Office*